Patented July 3, 1934

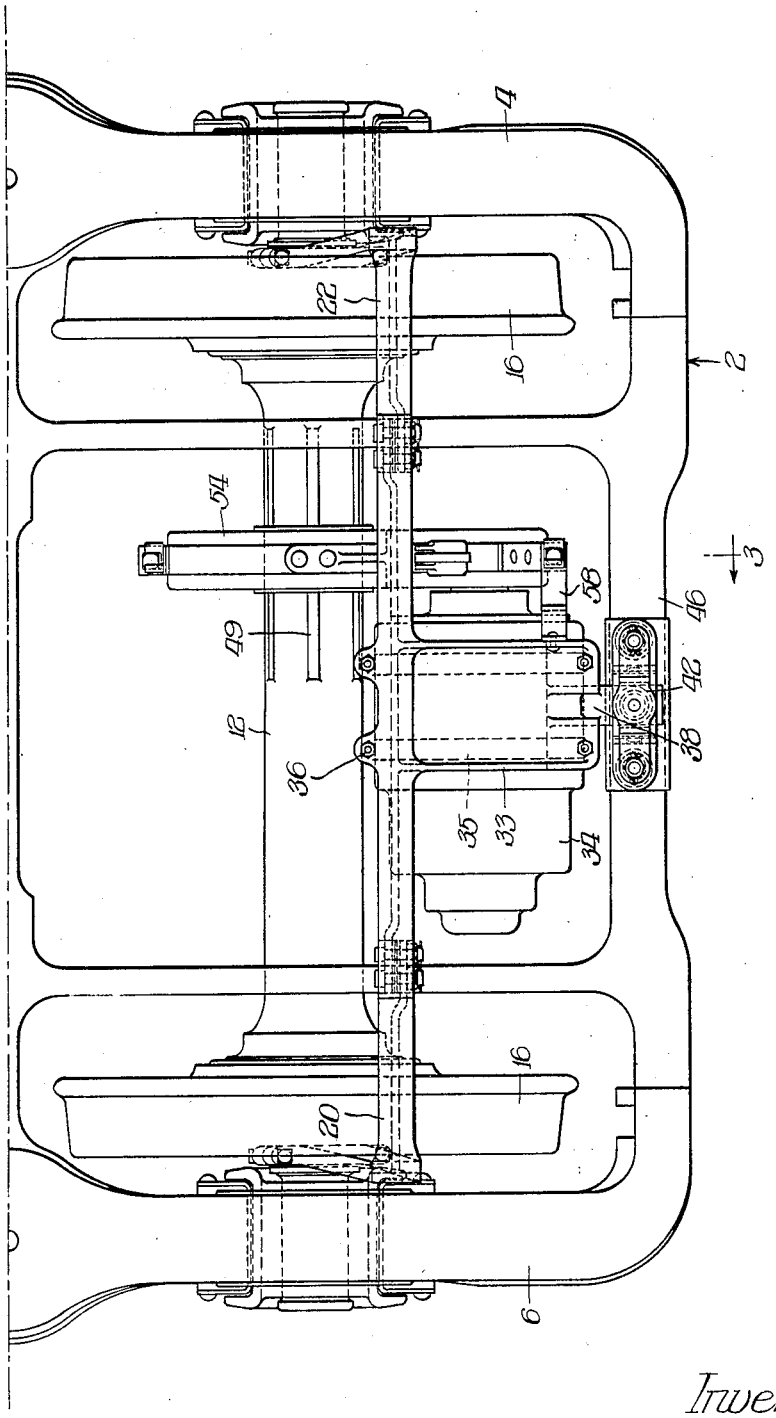

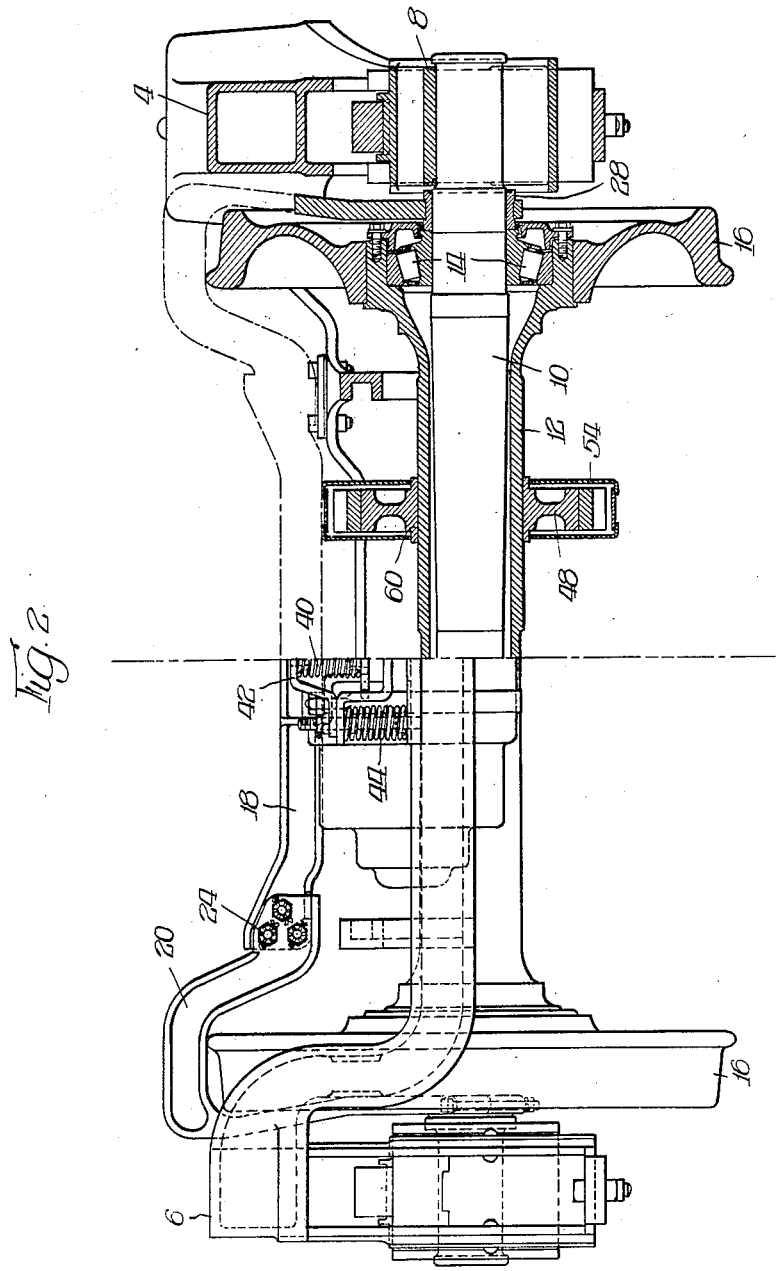

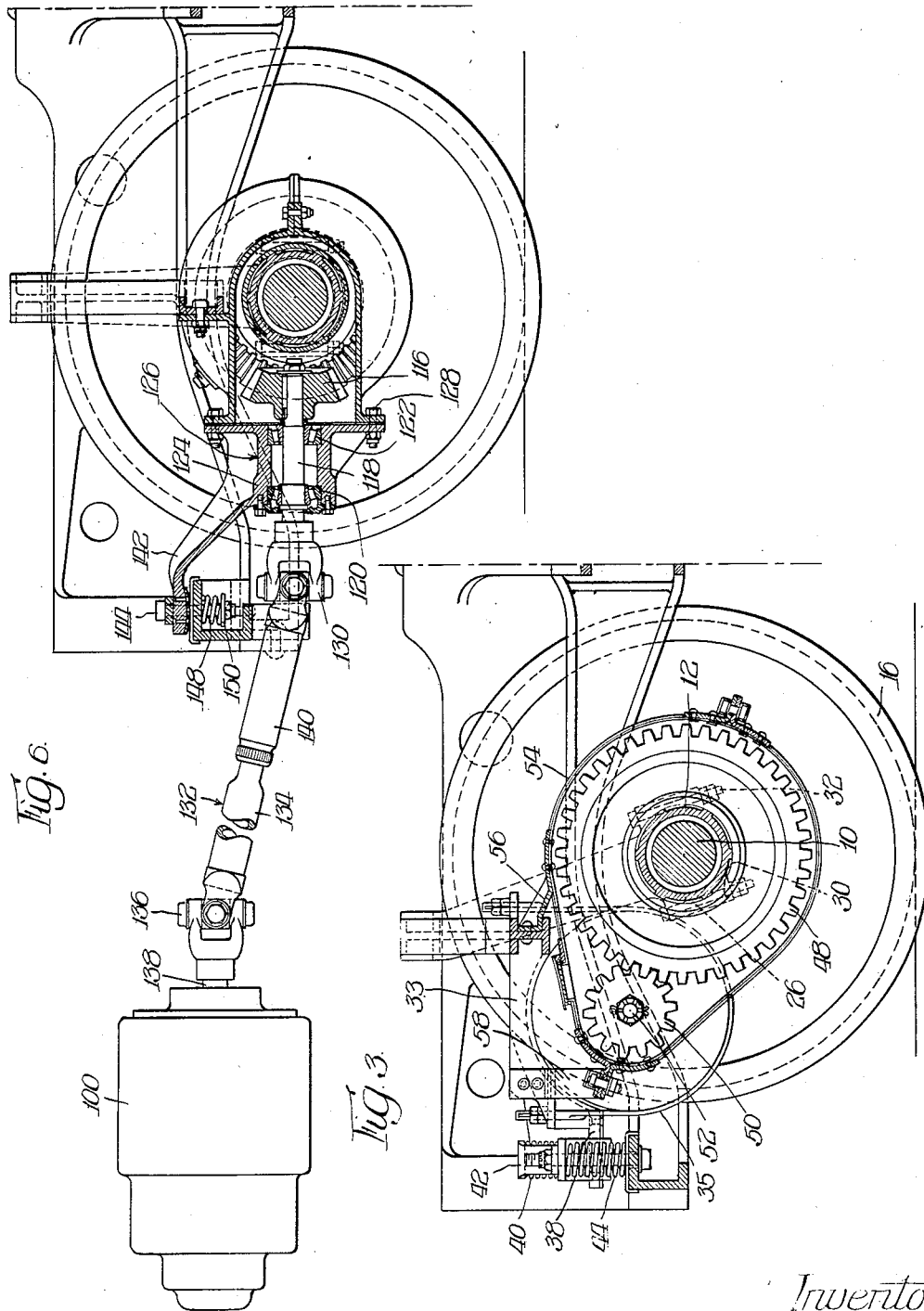

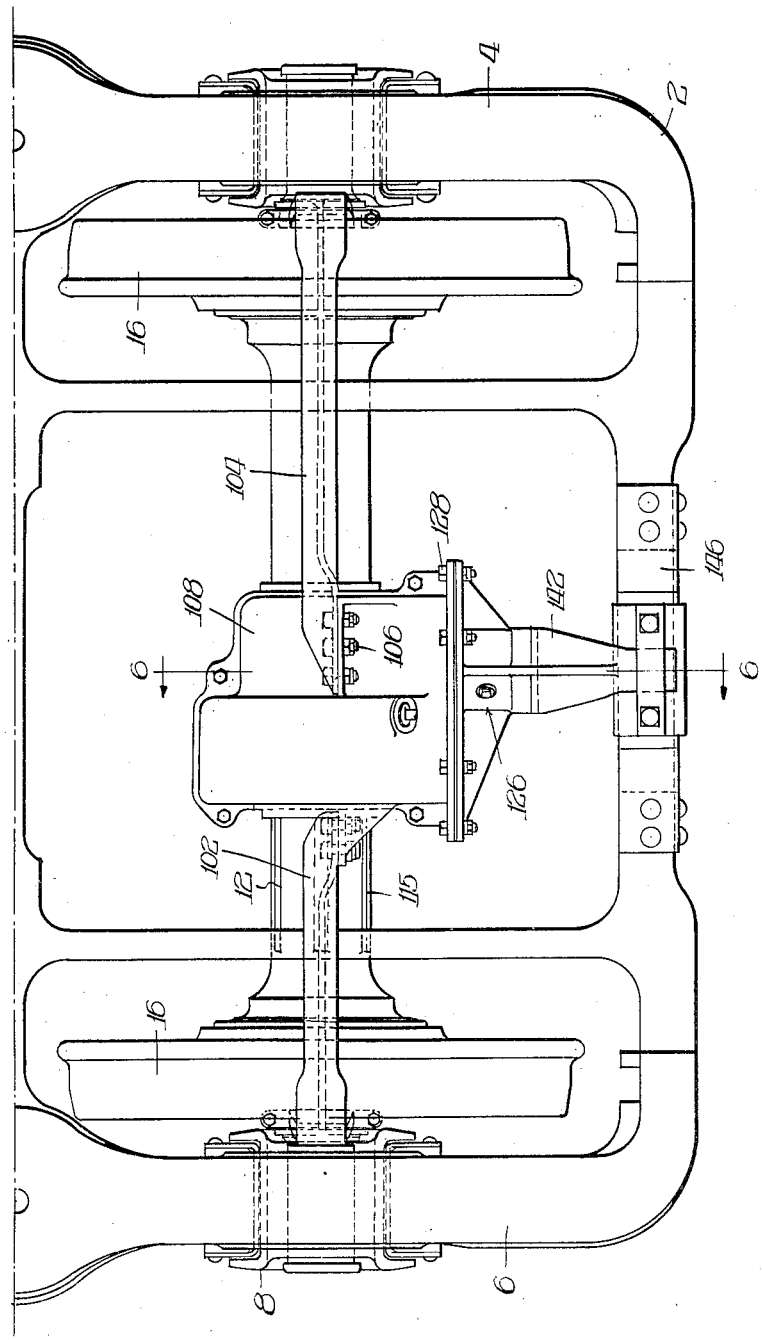

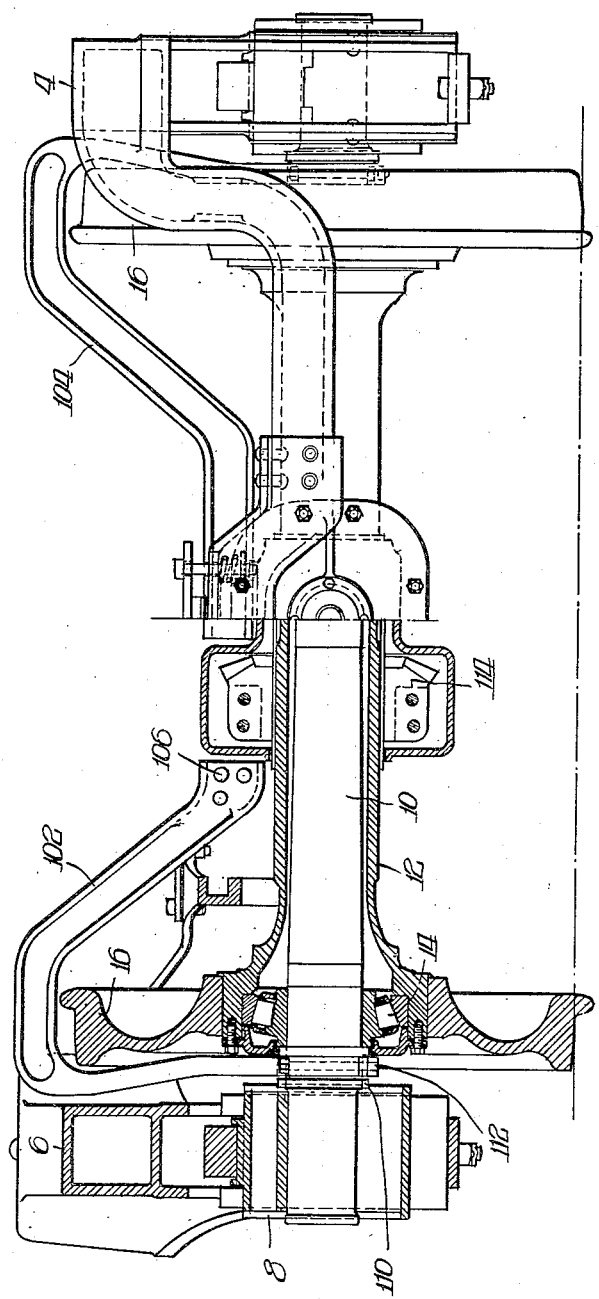

1,964,928

UNITED STATES PATENT OFFICE 1,964,928

TRUCK

Alfred H. Oelkers, Chicago, Ill., assignor to American Steel Foundries, Chicago, Ill., a corporation of New Jersey Application September 8, 1931, Serial No. 561,520

40 Claims. (Cl. 105—113)

The present invention relates to railway car trucks, and pertains more particularly to novel power take-off mechanisms and supporting means therefor associated with the trucks.

Among the objects of the present invention is to provide a novel power take-off adapted to be driven by an axle of a wheel and axle assembly of a car truck and for driving a power means or device, such as a generator, or the like.

The invention includes as an object the idea of providing a novel power take-off adapted to be associated with a railway car truck, the same being driven by one of the relatively movable axles of a wheel and axle assembly and supported upon the other of the relatively movable axles.

More particularly, the invention contemplates the idea of providing a novel power take-off including a gear or other driving element adapted to be mounted on one of the relatively movable axles of a wheel and axle assembly, which gear or driving element is enclosed within a housing or casing supported upon the other of said relatively movable axles.

Another object of the invention is to provide a novel support for a power take-off mechanism associated with a wheel and axle assembly of a railway car truck including a bracket mounted or supported on one of the relatively movable axles of the assembly, further means being provided for resiliently supporting the mechanism, either directly or indirectly, on a frame member of the truck.

Still another object of the present invention is to provide a novel supporting means for a power take-off, or the same together with a power means or mechanism, such as a generator, or the like, associated with a railway car truck, comprising means mounted on one of the relatively movable axles of a wheel and axle assembly for support thereof and to provide a two-point support for the power means, and means associated with a truck frame member for providing a one-point resilient support for either the power means, the take-off mechanism, or both.

The invention further comprehends the idea of providing a novel power take-off mechanism adapted to be associated with a power means or generator driven by one of the relatively movable axles of a wheel and axle assembly of a railway car truck, either of which, i. e., the take-off mechanism and power means, or both, may be suitably positioned so as to permit the truck frame, as likewise various members thereof, to shift or vibrate in various positions without affecting the operating efficiency of the mechanism.

Still another object of the invention is to provide a power take-off associated with and operated by one of the relatively movable axles of a wheel and axle assembly for a railway car truck and which includes a direct drive to an associated power means, such as a generator, or a drive suitably mounted in anti-friction means so as to eliminate possibility of unnecessary frictional losses and a resulting lessening of the efficiency of the power take-off assembly.

In the drawings, which illustrate an embodiment of the device and wherein like reference characters are used to designate like parts—

Figure 1 is a fragmentary top plan view of a truck incorporating an embodiment of the present invention;

Figure 2 is a view partly in end elevation and partly in transverse cross section through a wheel of the assembly shown in Figure 1 of the drawings;

Figure 3 is a fragmentary view in vertical cross section taken in a plane represented by line 3—3 of Figure 1 of the drawings;

Figure 4 is a fragmentary top plan view of a truck incorporating another embodiment made in accordance with the present invention;

Figure 5 is a view similar to Figure 2, partly in end elevation and partly in transverse cross section through the wheel of the assembly, and Figure 6 is a fragmentary view in vertical cross section taken in a plane represented by line 6—6 of Figure 4 of the drawings and disclosing in detail the association between the power means and drive therefor made in accordance with the present invention.

Referring now more in detail to the drawings, an embodiment selected to illustrate the present invention is disclosed in connection with a railway car truck comprising a truck frame 2 including side frames 4 and 6 suitably journaled by means of the journal boxes 8 upon the inner axle 10 of a wheel and axle assembly. This wheel and axle assembly further includes an outer axle 12 of hollow construction and adapted to enclose or house the inner axle 10, roller bearing units 14 of any desired construction being interposed between the axles and to permit rotary movement of the outer axle 12 which is associated with or has mounted thereon the car wheels 16.

The present invention pertains more particularly to novel means for supporting a power means, such as a generator, or the like, upon a car truck, as likewise a novel drive arrangement for effecting a drive between the rotary axle 12 and the generator. In the present embodiment, the novel supporting means includes a bracket, preferably formed with a central elongated portion 18 and end portions 20 and 22, these end portions being secured to the ends of the member 18, as by means of bolts 24, or the like. The end portions 20 and 22 of the bracket member are of such a configuration as to pass up and over the wheels 16, the ends thereof being provided with a curved bearing part or portion 26 adapted to rest upon or be supported by a collar 28 shrunk or pressed upon the inner axle 10. The end bearing portion 26 of each of these bracket portions are maintained in their operative position upon the bearing 28 by means of a collar piece 30 adapted to surround a portion of the collar or bearing 28 and be clamped to the bearing portion 26, as by means of the bolts 32, or the like. The central portion 18 of the bracket member is further formed with the laterally projecting portion or bracket 33 to which a generator 34 is secured or suspended therefrom, as by means of the straps or hangers 35, such means providing a two-point support or suspension for this generator. The generator bracket 33 is further provided with a projecting element or portion 38 adapted to be suspended from a coil spring 40 hung from a support 42 including the coil springs 44 mounted upon the transverse truck frame member 46 of the truck 2. It will be quite apparent from the drawings, that a three-point support has been provided for the generator 34, one of the supports of which includes a resilient mounting whereby the generator is free from substantial vibrations or shifting experienced by the railway car truck 2 or the wheel and axle assembly associated therewith.

The generator 34 is driven through the medium of a gear 48 suitably mounted upon the axle 12 and secured thereto for rotation by means of the integral keys 49 provided on the axle 12, the gear 48 being adapted to mesh with a pinion 50 mounted upon the shaft 52 of the generator rotor or armature. These two gears are suitably enclosed within a housing 54 partially supported by means of the bracket 56 secured to the central part 18 of the bracket member, and partially supported upon another bracket 58 suitably secured to the bracket portions 33. It will be seen that the housing 54 is entirely supported upon the brackets 56 and 58, suitable clearance being provided therebetween and the hub 60 of the gear 48 and the shaft 52 of the generator so as not to increase the frictional resistance between the operating parts to thereby lessen the efficiency of the assembly.

In Figures 4 to 6 inclusive, is disclosed an alternative construction varying from the previously described embodiment in that the generator 100 is suitably supported upon the car body. As in the previously described embodiment, the car body is supported upon the truck frame 2 having side frames 4 and 6 associated with the journal boxes 8 mounted upon the outer ends of the inner axle 10 of wheel and axle assemblies. As previously described, this wheel and axle assembly further includes an outer axle or housing 12 upon which the car wheels 16 are mounted, the roller bearing units 14 of any desired construction being interposed between these two axles to provide for rotary movement of the outer axle 12.

In this embodiment, the bracket member includes the two end parts 102 and 104 which are of such a construction as to pass above and over the wheels 16, these bracket members having their inner ends secured, as by means of the bolts 106, to a housing 108 of a power take-off for the generator 100, while the outer ends extend downwardly and are mounted upon the collars 110 shrunk or pressed upon the ends of the inner axle 10. These outer ends of the bracket members 102 and 104 are secured to the collars 110 by means of bolts 112 in a similar manner as hereinbefore described.

The housing 108 encloses or encases a beveled gear 114 fixed or secured to the axle 12 by means of the keys 115 integrally formed on the axle 12, this gear meshing with a beveled pinion 116 mounted on the inner end of a shaft 118 of the power take-off. This shaft 118 is suitably mounted upon the roller bearing units 120 and 122 positioned within the hollow hub 124 of a closure member 126, this closure member 126 being formed to fit an opening of the housing 108 and is secured thereto, as by means of the bolts 128. The shaft 118 is universally connected, as at 130, to a second shaft 132 which includes a splined shaft portion 134 universally connected, as at 136, to the shaft 138 of the rotor or armature of the generator 100. The splined shaft 134 is received within a hollow shaft portion 140, this arrangement being introduced so as to provide for effective transfer of power from the outer axle 12 to the generator 100 in the manner disclosed and during shifting or relative movement between the car truck 2, the wheel and axle assemblies and generator 100 which is secured to the car body. The housing 108 is further supported by means of a bracket 142 integral with the closure member 126 and which extends therefrom to receive a bolt 144 through its apertured outer end. The bolt 144 passes downwardly through an opening in the truck frame member 146 and is adapted to carry a coil spring 148 interposed between the washer 150 and the frame 146 for resiliently mounting or suspending the housing 108, whereby frictional resistance is eliminated between the housing 108 and the rotary axle 12. It will also be clearly seen that the anti-friction or roller bearing units 120 and 122 further eliminate frictional losses within the power take-off and between the axle 12 and generator 100.

While I have herein described and upon the drawings shown an illustrated embodiment of the invention, it is to be understood that the invention is not limited thereto but may comprehend other constructions, arrangements of parts, details, and features without departing from the spirit of the invention.

I claim:

1. In a truck construction, the combination of a wheel and axle assembly including a normally stationary axle, a bracket member connected to said axle, and generator operating mechanism including a housing connected to said bracket.

2. In a truck construction, the combination of a wheel and axle assembly including relatively movable axles, a bracket member connected to one of said axles, and a generator operating mechanism associated with the other of said axles and said bracket.

3. In a truck construction, the combination of a wheel and axle assembly including relatively movable axles, a bracket member connected to one of said axles, and a generator operating mechanism associated with the other of said axles and having a housing connected to said bracket.

4. In a truck construction, the combination of a wheel and axle assembly including relatively movable axles, a bracket member connected to one of said axles, and a generator operating mechanism including a driving element mounted on the other of said axles and a housing for said element connected to said bracket.

5. In a truck construction, the combination of a wheel and axle assembly, including an inner normally stationary axle, an outer rotary axle, a bracket member directly supported on said inner axle, a driving element mounted on said outer axle, and a housing for said driving element connected to said bracket.

6. In a truck construction, the combination of a wheel and axle assembly including relatively movable axles, brackets having their ends mounted on one of said axles, and a power take-off associated with said assembly and including a driving element mounted on the other of said axles, said power take-off having a housing supported on said brackets.

7. In a truck construction, the combination of a wheel and axle assembly including relatively movable axles, brackets having their ends mounted on one of said axles, and a power take-off associated with said assembly and including a driving element mounted on the other of said axles, said power take-off having a housing supported on said brackets, said power take-off further including universally connected shafts driven by said element.

8. In a truck construction, the combination of a wheel and axle assembly including relatively movable axles, a truck frame member, brackets having their ends mounted on one of said axles, and a power take-off associated with said assembly and including a driving element mounted on the other of said axles, said power take-off having a housing supported on said brackets and member.

9. In a truck construction, the combination of a wheel and axle assembly including relatively movable axles, a truck frame member, brackets having their ends mounted on one of said axles, a power take-off associated with said assembly and including a driving element mounted on the other of said axles, said power take-off having a housing supported on said brackets and member, and resilient means for supporting said housing on said member.

10. In a truck construction, the combination of a wheel and axle assembly including relatively movable axles, a power take-off including a driving element mounted on one of said axles, and a housing for said element directly supported by the other of said axles.

11. In a truck construction, the combination of a wheel and axle assembly including relatively movable axles, a truck frame member, a power take-off including a driving element mounted on one of said axles, and a housing for said element directly supported by the other of said axles and member.

12. In a truck construction, the combination of a wheel and axle assembly including relatively movable axles, a truck frame member, a power take-off including a driving element mounted on one of said axles, a housing for said element, means for directly supporting said housing on the other of said axles, and means for resiliently and directly supporting said housing on said member.

13. In a truck construction, the combination of a wheel and axle assembly including relatively movable axles, a power take-off including a driving element mounted on one of said axles, a housing for said element supported by the other of said axles in spaced relation with said first-named axle to provide clearance, and a shaft mounted in said housing and having a driven element thereon meshing with the first named element.

14. In a truck construction, the combination of a wheel and axle assembly including relatively movable axles, a power take-off including a driving element mounted on one of said axles, a housing for said power take-off supported by the other of said axles and in spaced relation with said first-named axle to provide clearance, universally connected shafts driven by said driven element and including a driven element meshing therewith, and anti-friction means for mounting one of said shafts in said housing.

15. In a truck construction, the combination of a wheel and axle assembly including normally fixed and rotary axles, power means having a driving element mounted on said rotary axle, a housing for said element, and means cooperating with said fixed axle for supporting said housing in spaced relation with said rotary axle to provide clearance.

16. In a truck construction, the combination of a wheel and axle assembly including normally fixed and rotary axles, power means having a driving element mounted on said rotary axle, a housing for said element, and means for supporting said housing in spaced relation with said rotary axle to provide clearance, said means including a bracket member secured to said housing and being supported on said fixed axle.

17. In a truck construction, the combination of a wheel and axle assembly including normally fixed and rotary axles, a truck frame member, power means having a driving element mounted on said rotary axle, a housing for said element, and means cooperating with said fixed axle for supporting said housing in spaced relation with said rotary axle to provide clearance, said means including resilient means associated with said frame member.

18. In a truck construction, the combination of a wheel and axle assembly including normally fixed and rotary axles, a truck frame member, power means having a driving element mounted on said rotary axle, a housing for said element, and means for supporting said housing in spaced relation with said rotary axle to provide clearance, said means including a bracket member secured to said housing and being supported on said fixed axle and resilient means associated with said frame member.

19. In a truck construction, the combination of a wheel and axle assembly including normally fixed and rotary axles, power means having a driving element mounted on said rotary axle, a housing for said element, and means for supporting said housing in spaced relation with said rotary axle to provide clearance, said means including a bracket extending transversely of said truck and having end portions secured to said fixed axle.

20. In a truck construction, the combination of a wheel and axle assembly including normally fixed and rotary axles, power means having a driving element mounted on said rotary axle, a housing for said element, and means for supporting said housing in spaced relation with said rotary axle to provide clearance, said means including brackets having an end connected to said housing and an end supported on said fixed axle.

21. In a truck construction, the combination of a wheel and axle assembly including normally fixed and rotary axles, power means including driving elements, one of said elements being secured to said rotary axle, a housing for said elements, and means for supporting said power means and housing including a bracket supported by said fixed axle.

22. In a truck construction, the combination of a wheel and axle assembly including normally fixed and rotary axles, a truck frame member, power means including driving elements, one of said elements being secured to said rotary axle, a housing for said elements, and means for supporting said power means and housing, said means including a bracket supported by said fixed axle and resilient means associated with said frame member.

23. In a truck construction, the combination of a wheel and axle assembly including a plurality of axles, a three-point supported bracket associated with said assembly, said bracket having two of said points of support on one of said axles, and power means secured to said bracket.

24. In a truck construction, the combination of a wheel and axle assembly including a plurality of axles, a three-point supported bracket associated with said assembly, said bracket having two points of support on one of said axles and a resilient third point of support, and power means secured to said bracket.

25. In a truck construction, the combination of a wheel and axle assembly including a plurality of axles, a truck frame member, a three-point supported bracket associated with said assembly, said bracket having two of said points of support on one of said axles and the third point of support on said frame member, and power means secured to said bracket.

26. In a truck construction, the combination of a wheel and axle assembly including a plurality of axles, a truck frame member, a three-point supported bracket associated with said assembly, said bracket having a resilient point of support on said frame member and the other two of said points of support on one of said axles, and power means secured to said bracket.

27. In a truck construction, the combination of a wheel and axle assembly including a plurality of axles, a three-point supported bracket associated with said assembly and having two of said points of support on one of said axles, power means supported by said bracket and including driving elements, one of said elements being mounted on another of said axles, and a housing for said elements supported by said bracket.

28. In a truck construction, the combination of a wheel and axle assembly including a plurality of axles, a three-point supported bracket associated with said assembly and having two of said points of support on one of said axles, power means supported by said bracket and including driving elements, one of said elements being mounted on another of said axles, and a housing for said elements supported by said bracket, said housing being supported in spaced relation with said last-named axle to provide clearance.

29. In a truck construction, the combination of a wheel and axle assembly including a plurality of axles, a truck frame member, a three-point supported bracket associated with said assembly, said bracket having two of said points of support on one of said axles and a third point of support on said member, power means supported by said bracket, said means including driving elements, one of said elements being mounted on another of said axles, and a housing for said elements supported by said bracket.

30. In a truck construction, the combination of a wheel and axle assembly including a plurality of axles, a truck frame member, a three-point supported bracket associated with said assembly, said bracket having two of said points of support on one of said axles and a third point of support on said member, power means supported by said bracket, said means including driving elements, one of said elements being mounted on another of said axles, and a housing for said elements supported by said bracket, said housing being supported in spaced relation with said last-named axle to provide clearance.

31. In a truck construction, the combination of a wheel and axle assembly including a plurality of axles, a truck frame member, a three-point supported bracket associated with said assembly, said bracket having two of said points of support on one of said axles and a third resilient point of support on said member, power means supported by said bracket, said means including driving elements, one of said elements being mounted on another of said axles, and a housing for said elements supported by said bracket.

32. In a truck construction, the combination of a wheel and axle assembly including normally fixed and rotary axles, a power take-off associated with said assembly and including a driving element mounted on said rotary axle, said power take-off having a housing, means for supporting said housing on said fixed axle, said power take-off further including universally connected shafts driven by said element.

33. In a truck construction, the combination of a wheel and axle assembly including normally fixed and rotary axles, a truck frame member, a power take-off associated with said assembly and including a driving element mounted on said rotary axle, said power take-off having a housing, means for supporting said housing on said fixed axle and said frame member, said power take-off further including universally connected shafts driven by said element.

34. In a truck construction, the combination of a wheel and axle assembly including normally fixed and rotary axles, a truck frame member, a power take-off associated with said assembly and including a driving element mounted on said rotary axle, said power take-off having a housing, means providing a three point support for said housing, two of said points being on said fixed axle and a third point of support being on said frame member, said power take-off further including universally connected shafts driven by said element.

35. In a car, the combination of a car body, a wheel and axle assembly including normally fixed and rotary axles, power means secured to said body and having a rotor, a power take-off associated with said assembly and including a driving element mounted on said rotary axle, said power take-off having a housing, means for supporting said housing on said fixed axle, said power take-off further including universally connected shafts driven by said element and connected to said rotor for driving the same.

36. In a car, the combination of a car body, a truck therefor including a wheel and axle assembly having normally fixed and rotary axles, a truck frame member, power means secured to said body and having a rotor, a power take-off associated with said assembly and including a driving element mounted on said rotary axle, said power take-off having a housing, means for supporting said housing on said fixed axle and frame member, said power take-off further including universally connected shafts driven by said element and connected to said rotor for driving the same.

37. In a car, the combination of a car body, a truck therefor including a wheel and axle assembly having normally fixed and rotary axles, a truck frame member, power means secured to said body and having a rotor, a power take-off associated with said assembly and including a driving element mounted on said rotary axle, said power take-off having a housing, means for supporting said housing on said fixed axle and frame member, and driving means between said rotor and element.

38. In a car, the combination of a car body, a truck therefor including a wheel and axle assembly having normally fixed and rotary axles, a truck frame member, power means secured to said body and having a rotor, a power take-off associated with said assembly and including a driving element mounted on said rotary axle, said power take-off having a housing, means providing a three point support for said housing, two of said points being on said fixed axle and a third point of support being on said frame member, and driving means between said rotor and element.

39. In a truck construction, the combination of a wheel and axle assembly having normally fixed and rotary axles, a truck frame member, a power take-off having a drive element mounted on said rotary axle, a housing for said element mounted on said fixed axle and including a closure member connected thereto and supported on said frame member, and a shaft journaled in said closure member and driven by said drive element.

40. In a truck construction, the combination of a wheel and axle assembly having normally fixed and rotary axles, a truck frame member, a power take-off having a drive element mounted on said rotary axle, a housing for said drive element, means providing a three point support therefor, said means including brackets mounted on said fixed axle outwardly of said wheels, said housing having a closure member therefor provided with a bracket supported on said frame member providing a third support, and a shaft journaled in said closure member and driven by said drive element.

ALFRED H. OELKERS.